(12) United States Patent
Chen et al.

(10) Patent No.: US 7,585,582 B2
(45) Date of Patent: Sep. 8, 2009

(54) FUEL CELL MODULE UTILIZING WAVE-SHAPED FLOW BOARD

(75) Inventors: Jiun-Ming Chen, Taipei County (TW); Yu-Chih Lin, Kao-Hsiung (TW); Su-Yun Yu, Tao-Yuan (TW); Chiang-Wen Lai, Taipei (TW); Ching-Sen Yang, Taoyuan County (TW)

(73) Assignee: Nan Ya Printed Circuit Board Corporation, Taoyuan (TW)

( * ) Notice: Subject to any disclaimer, the term of this patent is extended or adjusted under 35 U.S.C. 154(b) by 40 days.

(21) Appl. No.: 11/460,994

(22) Filed: Jul. 30, 2006

(65) Prior Publication Data

US 2008/0003484 A1 Jan. 3, 2008

(30) Foreign Application Priority Data

Jun. 28, 2006 (TW) ............................... 95123338 A

(51) Int. Cl.
*H01M 8/02* (2006.01)
(52) U.S. Cl. .............................. 429/38; 429/36; 429/233
(58) Field of Classification Search ................. 429/211, 429/233, 36, 38, 237, 242
See application file for complete search history.

(56) References Cited

U.S. PATENT DOCUMENTS 4,214,969 A * 7/1980 Lawrance ................... 204/255
6,255,012 B1 * 7/2001 Wilson et al. ................. 429/38
7,005,209 B1 2/2006 Gaines
7,229,564 B2 6/2007 Liu
2005/0158604 A1 * 7/2005 Wariishi et al. ............... 429/32
2005/0202297 A1 * 9/2005 Schmitz et al. ............... 429/32
2007/0134542 A1 6/2007 Chang

FOREIGN PATENT DOCUMENTS

| CN | 1405910 A | 3/2003 |
|---|---|---|
| CN | 1750305 A | 3/2006 |
| TW | I222765 | 10/2004 |
| TW | I241048 | 10/2005 |
| TW | M291089 | 5/2006 |

* cited by examiner

*Primary Examiner*—Patrick Ryan
*Assistant Examiner*—Monique Wills
(74) *Attorney, Agent, or Firm*—Winston Hsu

(57) ABSTRACT

A fuel cell module includes a cathode board, an integral flow board integrated with a plurality of wave-shaped anode plates and membrane electrode assembly (MEA) interposed between the cathode board and the integral flow board. The integral flow board has a body substrate that is formed of ejection moldable polymers by using ejection-molding techniques. The wave-shaped anode plate defines a plurality of independent flow channels and is fittingly affixed in corresponding reaction zone of the body substrate.

14 Claims, 10 Drawing Sheets

FUEL CELL MODULE UTILIZING WAVE-SHAPED FLOW BOARD

BACKGROUND OF THE INVENTION

1. Field of the Invention

The present invention relates to fuel cells, and more particularly, to a fuel cell module integrated with a wave-shaped flow board.

2. Description of the Prior Art

A fuel cell is an electrochemical cell in which a free energy change resulting from a fuel oxidation reaction is converted into electrical energy. Fuel cells utilizing methanol as fuel are typically named as Direct Methanol Fuel cells (DMFCs), which generate electricity by combining gaseous or aqueous methanol with air. DMFC technology has become widely accepted as a viable fuel cell technology that offers itself to many application fields such as electronic apparatuses, vehicles, military equipments, aerospace industry and so on.

DMFCs, like ordinary batteries, provide dc electricity from two electrochemical reactions. These reactions occur at electrodes (or poles) to which reactants are continuously fed. The negative electrode (anode) is maintained by supplying methanol, whereas the positive electrode (cathode) is maintained by the supply of air. When providing current, methanol is electrochemically oxidized at the anode electrocatalyst to produce electrons, which travel through the external circuit to the cathode electrocatalyst where they are consumed together with oxygen in a reduction reaction. The circuit is maintained within the cell by the conduction of protons in the electrolyte. One molecule of methanol ($CH_3OH$) and one molecule of water ($H_2O$) together store six atoms of hydrogen. When fed as a mixture into a DMFC, they react to generate one molecule of $CO_2$, 6 protons (H+), and 6 electrons to generate a flow of electric current. The protons and electrons generated by methanol and water react with oxygen to generate water. The methanol-water mixture provides an easy means of storing and transporting hydrogen, much better than storing liquid or gaseous hydrogen in storage tanks.

The DMFC module usually includes a current collector (or also referred to as charge collector board) and a flow board, which both play important roles. The current collector collects the electrons generated from the electron-chemical reaction, and the flow board manages and controls the distribution of the fuel. In the past, the flow board design has focused on enabling fuel to pass smoothly through the fuel channel into the membrane electrode assembly (MEA).

The prior flow boards use graphite or glass fiberboard such as FR4, FR5 as the materials of the body substrates. Conventionally, the flow board is made in a computer numerical control (CNC) mill lathe. The shortcomings of CNC mill lathe include low yield and high cost. The prior body substrates, which are made of graphite, FR4, or FR5, have poor mechanical properties, and occupy too much space. The above reasons are disadvantageous for the yield and popularization of the fuel cell.

To apply the fuel cell in the laptops, cellular phones or PDA, reduction both in cost and cell volume are required. Hitherto, there are still challenges in developing relevant elements of fuel cells. There is a strong need in this industry to combine these relevant elements with fuel cell mechanism at design phase thereby obtaining breakthrough in aspects of lighter, thinner, smaller fuel cell devices or modules, which are more practicable.

In conclusion, a well designed flow board does not only depend on choosing a material that is resistive to corrosion caused by gaseous/liquid fuel and/or the chemical reactant, but also requires choosing a material that has superior mechanical properties, low cost, and fast mass production. There is a need to improve both the materials and the manufacturing methods utilized in conventional flow boards.

SUMMARY OF THE INVENTION

In view of the above reasons, the main purpose of the present invention is providing an improved flow board, better and smaller fuel cell module and cost-effective manufacturing method thereof in order to improve the shortcoming of the prior art.

According to the claimed invention, a fuel cell module with wave-shaped flow board is provided. The fuel cell module includes a cathode conductive plate; an anode flow board comprising a wave-shaped current collector fittingly embedded in a recessed reaction zone of a body substrate plate made of injection moldable polymer materials, wherein the wave-shaped current collector defines a plurality of independent fuel channels within the reaction zone; and a membrane electrode assembly (MEA) interposed between the cathode conductive plate and the anode flow board.

These and other objectives of the present invention will no doubt become obvious to those of ordinary skill in the art after reading the following detailed description of the preferred embodiment that is illustrated in the various figures and drawings.

DETAILED DESCRIPTION

As previously mentioned, the conventional current collector or charge collector board using gold foil is expensive. The present invention provides a novel mechanism and method to integrate current collector with flow board. A fuel cell module is formed by laminating parts including the integrated current collector and flow board, thereby reducing its volume and cost and is thus applicable to 3C products.

The present invention pertains to a flow board of a fuel cell utilizing gaseous or liquid fuel. The flow board has one or more than one reaction zones. The methanol fuel flows and reacts to generate electric current after the membrane electrode assembly (MEA) is laminated on and affixed to the flow board.

The flow board of the fuel cell in the present invention is an equipment reacted hydrogen or hydrogen compound with a catalyst, and the chemical energy changes to electric power. The flow board of the present invention is provided for the proton exchange membrane fuel cell used in portable electric products. It needs to be light, thin, and small, and to resist the chemical corrosion of the gaseous/liquid fuel and its reactant, and has superior mechanical properties.

Figure 1:
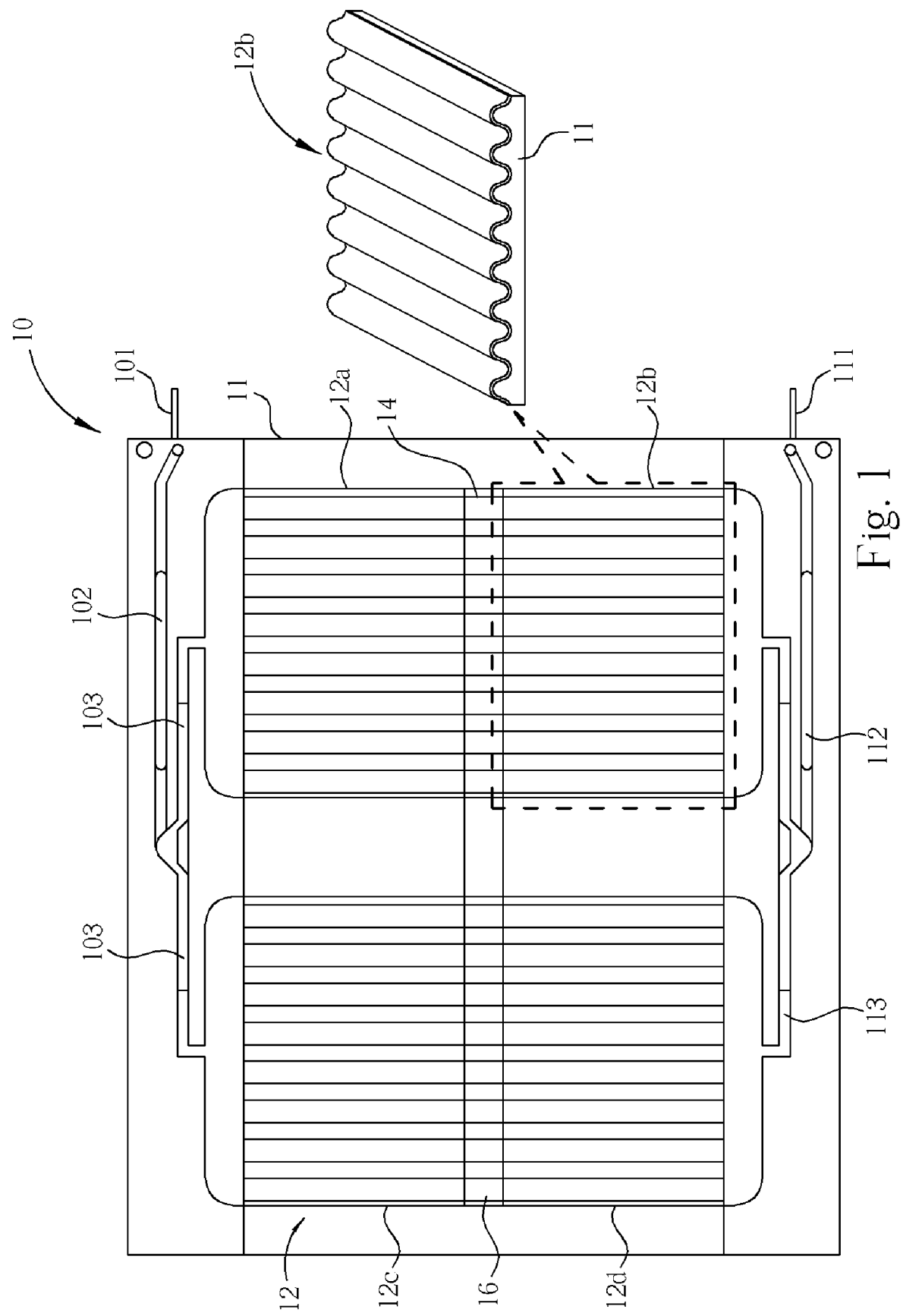
FIG. 1 illustrates a top view schematic diagram of a flow board according to the preferred embodiment of the present invention.

Please refer to FIG. 1, which illustrates a top view schematic diagram of a flow board according to the embodiment of the present invention. As FIG. 1 shows, the flow board 10 of the present invention includes a body substrate 11, and at least a wave-shaped reaction zone 12. Take four wave-shaped reaction zones 12a, 12b, 12c, and 12d in FIG. 1 as an example. The lateral view of reaction zone 12b is the right diagram in FIG. 1. The fuel channels of reaction zones 12a, 12b, 12c, and 12d have the same flowing direction, from top to bottom or from bottom to top. The fuel channels of the reaction zones 12a and 12b interflow with each other. The fuel channels of the reaction zones 12c and 12d also interflow with each other. A crossing zone 14 is between the reaction zones 12a and 12b. A crossing zone 16 is between the reaction zones 12c and 12d.

The present invention does not limit one surface of the body substrate 11 to have the wave-shaped reaction zone. The other surface of the body substrate 11 could have the same wave-shaped reaction zone. Therefore, the present invention can apply to fuel channels on a single surface, or fuel channels on double surfaces.

As FIG. 1 shows, the body substrate 11 has a fuel inlet 101, input fuel channel 102, and manifold 103 at one end for injecting fuel. The fuel, such as methanol, flows into independent fuel channels of the reaction zone 12a, and 12c through the fuel inlet 101, input fuel channel 102, and manifold 103, and then flows into the reaction zones 12a and 12c, which are connected with the reaction zones 12b and 12d, respectively. Finally, the fuel flows out through the output fuel channels 112, and 113, and a fuel outlet 111.

One kernel feature of the present invention is that the fuel channels of reaction zones 12a, 12b, 12c, and 12d have the same flowing direction, e.g. from top to bottom or from bottom to top. The reaction zones 12a and 12b connect with each other, and the reaction zones 12c and 12d connect with each other. Each fuel channel of the reaction zones 12a, 12b, 12c, and 12d is independent from others to provide smooth and uniform flow.

According to the preferred embodiment of the present invention, the body substrate 11 of the flow board is made by injection molding methods with injection moldable polymer materials, which are able to be molded utilizing said injection molding methods, such as polyetheretherketone (PEEK), polyetherketoneketone (PEKK), Polysulfone (PSU), liquid crystal polymer (LCP), polymer plastic substrate or a compound of engineering plastic.

It is noteworthy that not every injection moldable polymer materials that can be molded by injection molding method can form the body substrate 11 of the flow board in the present invention. Take ABS resin, PP resin, and polycarbonate (PC) for example. These substances can be molded by injection molding methods, but they cannot resist methanol and do not have superior mechanical properties, so they are unsuitable. Therefore, the suitable materials are those listed in the above paragraph, with PSU being particularly suitable.

The above-mentioned injection moldable polymer materials could be further injected concurrently with filler. The above-mentioned filler could be a modifier, floating magnet, mold-release agent etc.

The embodiment of forming the flow board of the present invention is illustrated by the following example (the material of the flow board is PSU in the example).

The injection molding method of forming the flow board of the present invention includes three basic steps: melting, floating, and solidifying. The powder PSU is melted to a liquid state by heating. Then, the melted PSU is injected into the mold, and cools down to become solid. The whole process is fast and automatic, and is especially suitable for mass production.

(1) Melting: the powder PSU is deformed under heat and pressure.

(2) Floating: the deformed PSU is filled in the whole mold under pressure.

(3) Solidifying/cooling: Once the PSU is cooled down it will be taken out.

Figure 2:
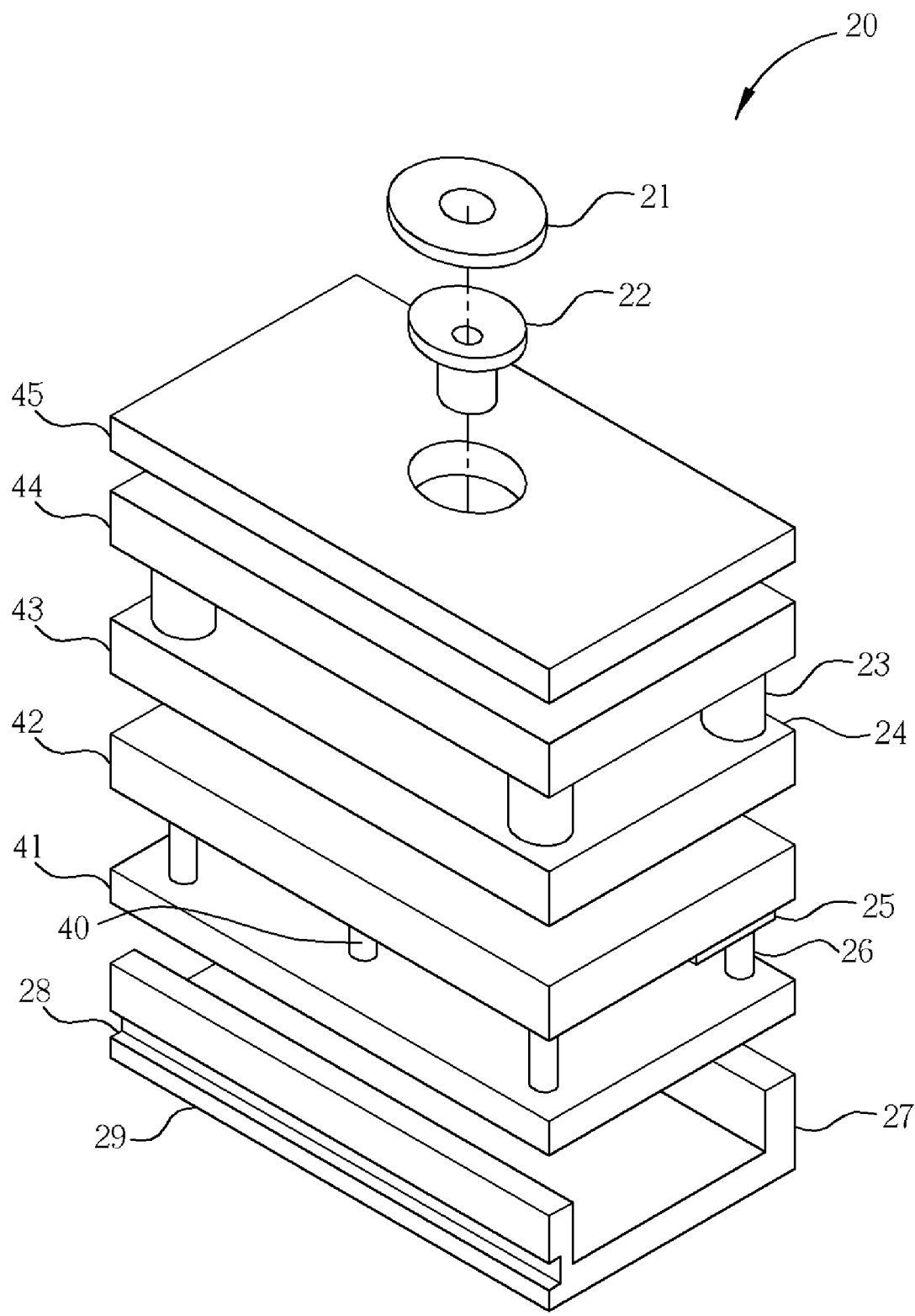
FIG. 2 illustrates a decomposed schematic diagram of the mold of the present invention.

FIG. 2 illustrates a decomposed schematic diagram of the mold 20 of the present invention. The mold 20 of the present invention includes a positioning ring 21, an injection brushing 22, guide pins 23, a membrane 24, an ejection plate 25, an ejection pin 26, a C stick 27, a groove 28, an ejection cover 29, an injection injector 40, an injection fixed plate 41, a support plate 42, a B board 43, an A board 44, and a top plate 45. Please note that the present invention is not limited to the above-mentioned mold.

The wave-shaped reaction zone 12 of the present invention and the body substrate 11 could be made monolithic at the same time. Furthermore, the wave-shaped reaction zone 12 could also be made in other ways. For example, a current collector plate defines fuel channels. The current collector plate is then combined with the body substrate 11 that is made by the injection molding methods.

Figure 3:
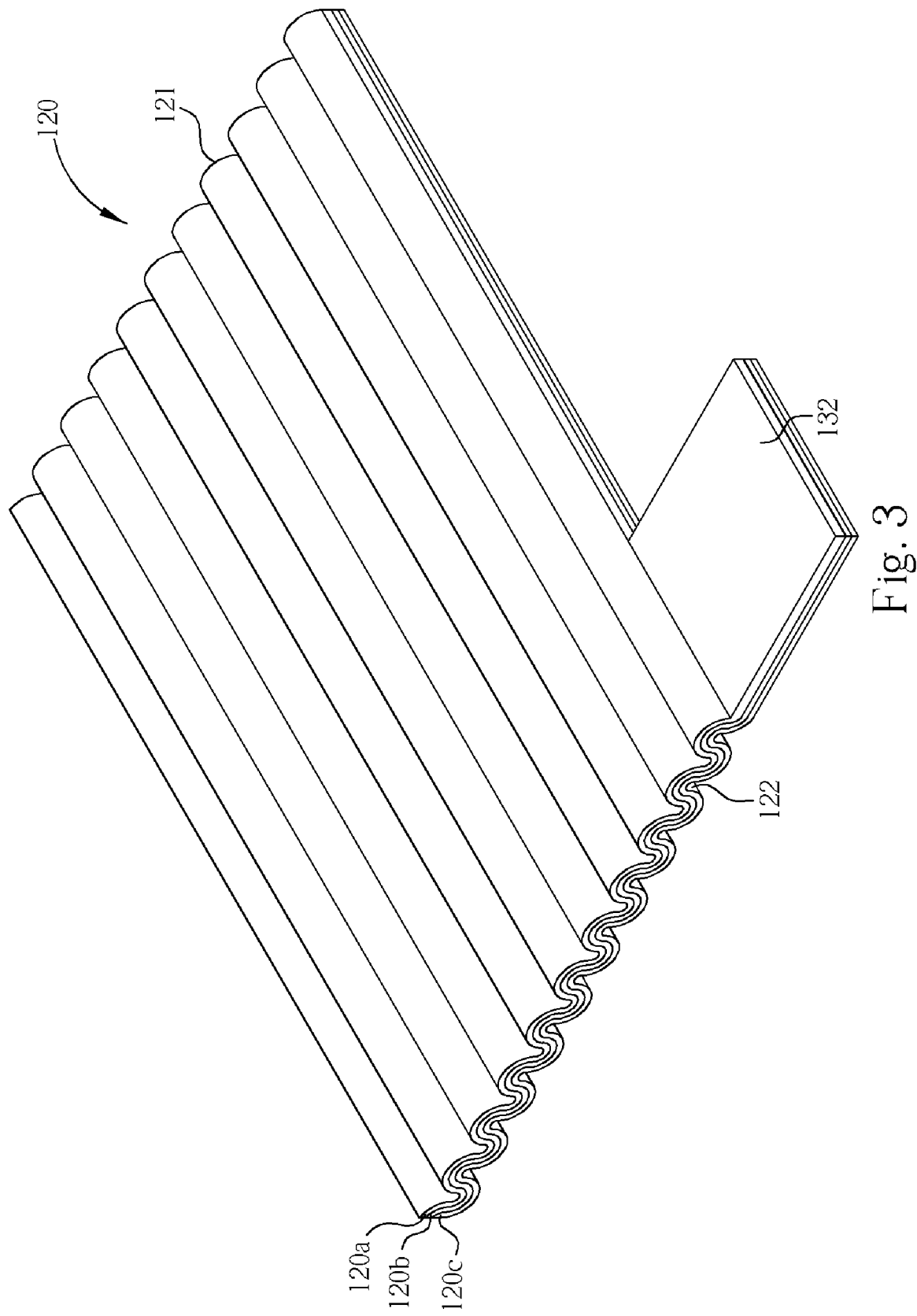
FIG. 3 illustrates a schematic diagram of a current collector, which defines wave-shaped fuel channels according to another embodiment of the present invention.

Please refer to FIG. 3, which illustrates a schematic diagram of a current collector 120, which is defined as a wave-shaped fuel channel according to another preferred embodiment of the present invention. In the embodiment, the current collector (anode) 120 is made from stainless steel or metal materials that are able to resist chemical corrosion from gaseous/liquid fuel of the fuel cell, such as the thin substrate 120a made by SUS316, SUS316L, SUS304, SUS304L, and titanium (Ti) alloy, and are made by a stamping process to form the wave-shaped fuel channels.

As shown in FIG. 3, the front surface 121 of the current collector 120 is formed by a plurality of independent wave-shaped fuel channels utilizing the stamping process for ensuring that the gaseous/liquid fuel flows smoothly. If the substrate 120a is made from stainless steel, which has higher resistance, the back 122 of the current collector 120 could be plated with a copper film 120b to decrease electrical resistance. An electro-coating paint or so-called ED paint 120c can cover and isolate the copper film 120b. The copper film 120b does not contact with the gaseous/liquid fuel of the fuel cell, such that the copper does not separate out or diffuse out to poison the fuel cell. The current collector 120 further includes a projective, bendable conductive lug portion 132. This connects electrically with the current collector 120 and the circuit of the cathode conductive plate, and allows electron output.

Figure 4:
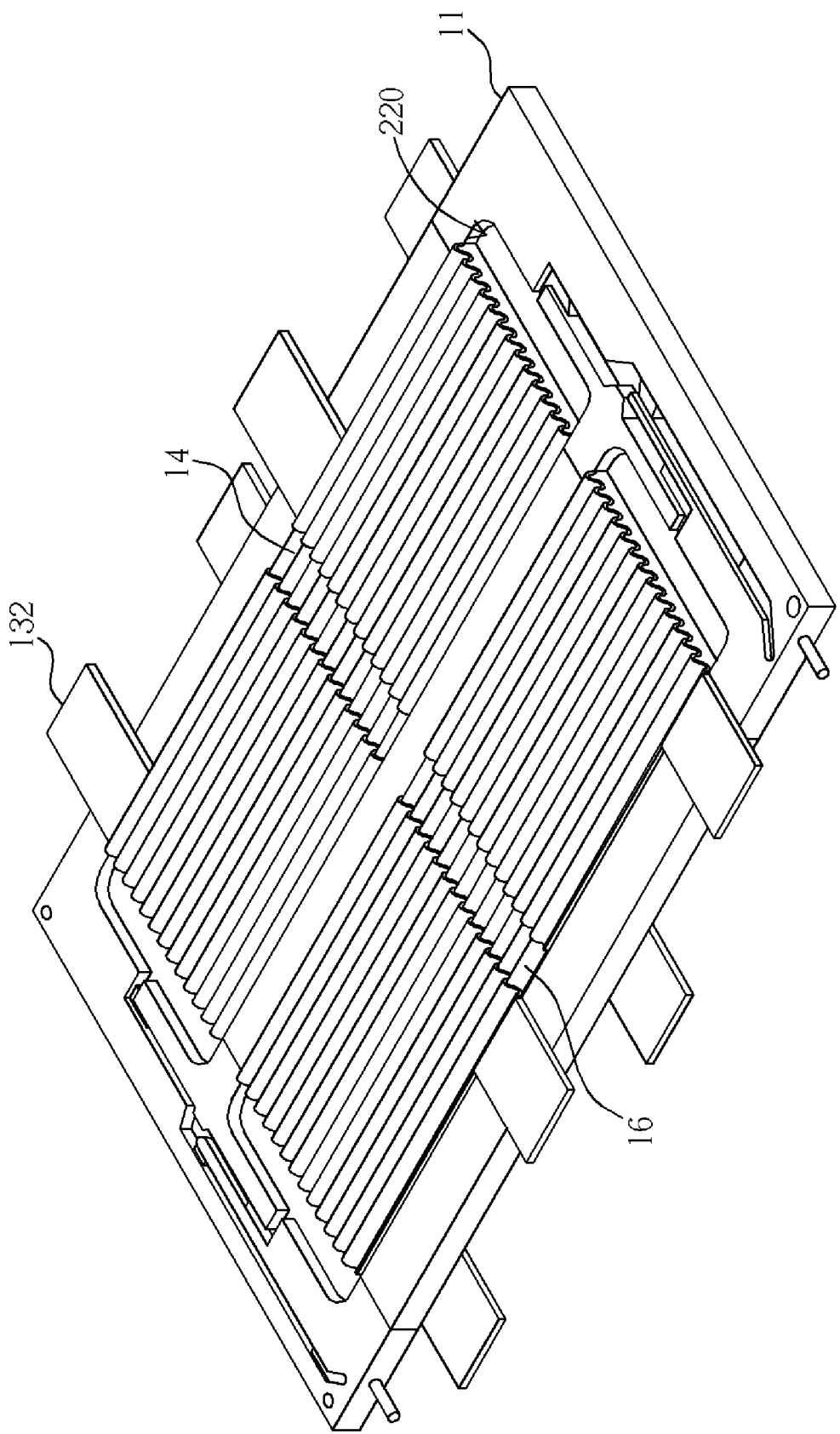
FIG. 4 illustrates a schematic diagram of the current collector of FIG. 3 that is mounted on a body substrate.

The current collector 120 of FIG. 3 is affixed to the body substrate 11 made by injection molding methods as shown in FIG. 4. The current collector 120 may be adhered to the body substrate 11 by epoxy AB glue or other types of epoxy resins. The current collector 120 could also be jammed or wedged into the body substrate 11 or fixed by screws. The wave-shaped current collector may be mounted on the reaction zone by pressing-adhesive method, pressing-wedging method or pressing-snapping method. The current collector 120 is deposited in a corresponding recessed zone 220 provided by the body substrate 11. The shapes of the recessed zone and the current collector 120 are matched in order to save space.

In the direction of fuel channels, the crossing zones 14, and 16 are between the two adjacent current collectors 120. The fuel channels on the crossing zones 14, and 16 are monolithic with the body substrate 11, and connect with the corresponding fuel channels of the current collector 120. The conductive lug portion 132 is bended to connect electrically with the circuit of a cathode conductive plate (not shown). The conductive lug portion 132 can be connected in series or in parallel with the battery cells.

The current collector integrated on the body substrate 11 has at least the following advantages. First, the current collector could be made from stainless steel. Compared with the prior art, which uses gold, the present invention reduces cost. The stainless steel substrate forming the wave-shaped fuel channels by a stamping process is very simple and fast. Furthermore, the current collector 120 formed on the body substrate 11 could decrease the whole thickness of the fuel cell.

According to this invention, the fuel cell module having integrated wave-shaped flow board is lighter, thinner and smaller, and has an advantage of low cost. The following summarizes a preferred example illustrating the procedure of fabricating a 4 W fuel cell module in accordance with this invention.

Fabrication of the current board is show in FIG. 3. Stamping process and metal materials capable of resisting gaseous or liquid fuel and chemical corrosion such as stainless steel including but not limited to SUS316LSUS316 SUS304 SUS304L, and titanium alloys are employed to form the base layer of the current collector 120. The current collector 120 has two parts. The first part is wave-shaped channel region, which allows gaseous or liquid fuel to flow therethrough. The body substrate of the flow board has a corresponding recessed area, which may have corresponding wave-shape, for fittingly accommodating the first part of the current collector 120 and saving space. The second part is the projecting lug portion 132, which allows current output.

Fabrication of the body substrate of the flow board. The body substrate of the flow board is made of polymer materials by using injection molding methods. Alternatively, the body substrate of the flow board may be made by using CNC mill lathe. The shape of the fuel channels matches the shape of the current collector, as shown in FIGS. 1 and 4.

Lamination and bonding of the current collector and the body substrate of the flow board. As shown in FIG. 4, epoxy AB glue is applied on the body substrate 11, then the current collector 120 is adhered to the body substrate 11. It is one kernel feature that the current collector 120 is integrated with the body substrate 11 of the flow board, thereby constituting an anode flow board with an integral wave-shaped current collector, wherein the current collector 120 functions as an anode of the fuel cell module.

Figure 5:
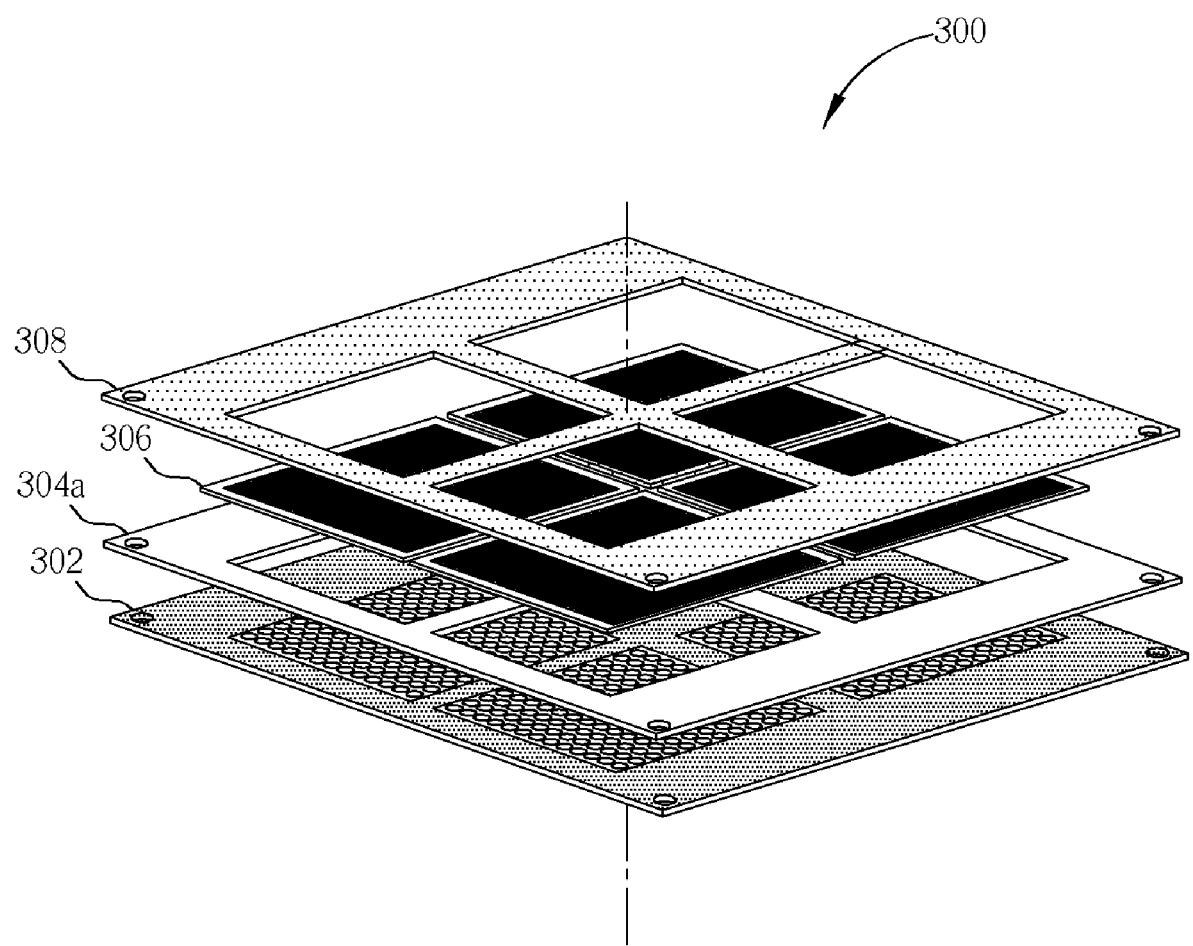
FIG. 5 is an exploded diagram of the bipolar plate according to this invention.

Fabrication of the bipolar plate is shown in FIG. 5. Thermal-pressing type adhesive film or bonding material film 304a such as BYPP is placed on the cathode conductive plate 302. MEA 306 and MEA positioning frame 308 are placed on the bonding material film 304a, as shown in FIG. 5. After thermal pressing process, the laminate structure becomes a bipolar plate. The aforesaid BYPP melts at high temperature and becomes adhesive. After cooling, a permanent bonding interface forms between the cathode conductive plate 302 and the MEA frame 308. The aforesaid cathode conductive plate 302 may be PCB, graphite plate or metal plate.

Figure 6:
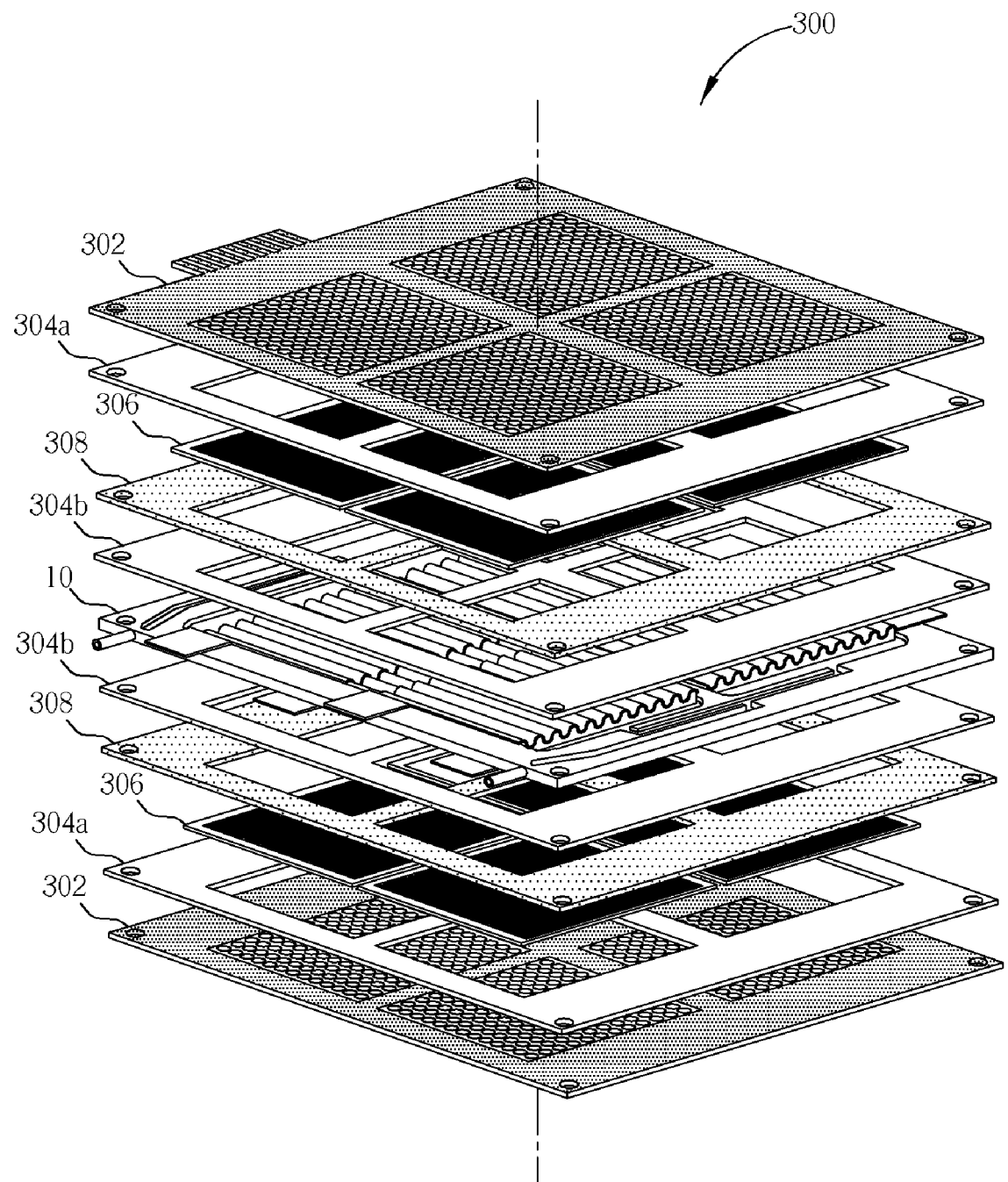
FIG. 6 is an exploded diagram of the fuel cell module according to this invention.
Figure 7:
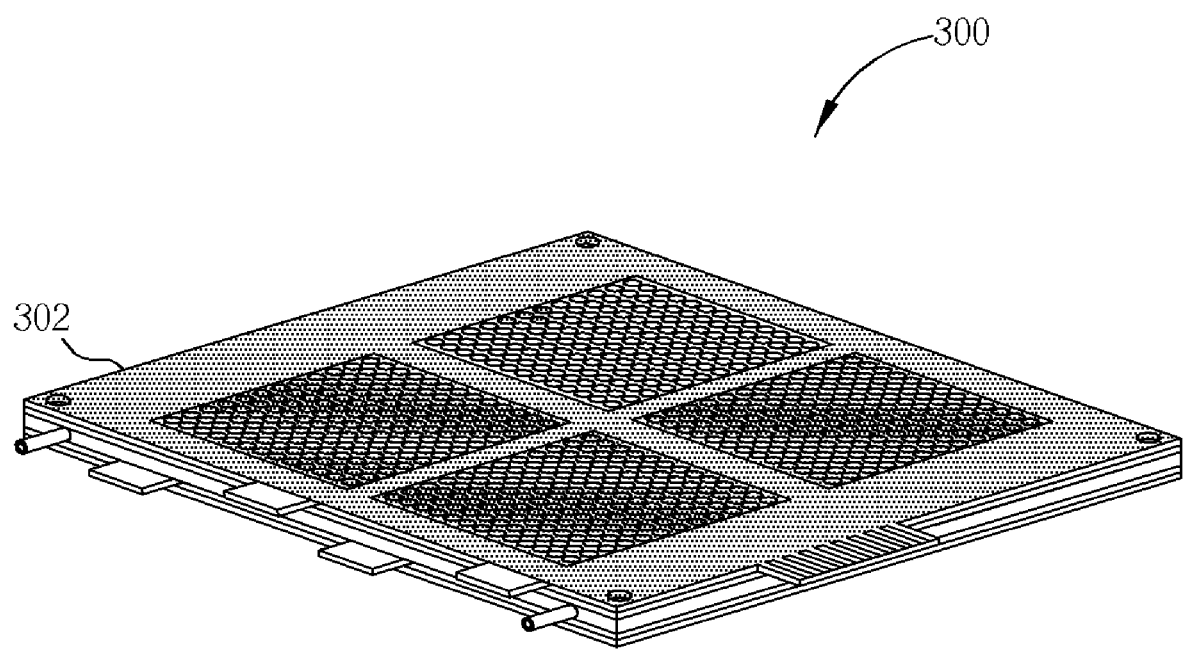
FIG. 7 is a prospective view of the fuel cell module assembly according to this invention.

Lamination and pressing of the 4 W fuel cell module is shown in FIGS. 6 and 7. An anode flow board 10 embedded with a plurality of current collectors is then laminated with adhesive material films 304b, and the aforesaid bipolar plates, which undergo a thermal pressing process to form a thin fuel cell module 300, as shown in FIG. 7. Each side of the thin fuel cell module 300 has four cell units. In this case, one fuel cell module 300 has eight cell units, which with 0.5 W per cell unit makes the fuel cell module 300 have 4 W output.

Figure 8:
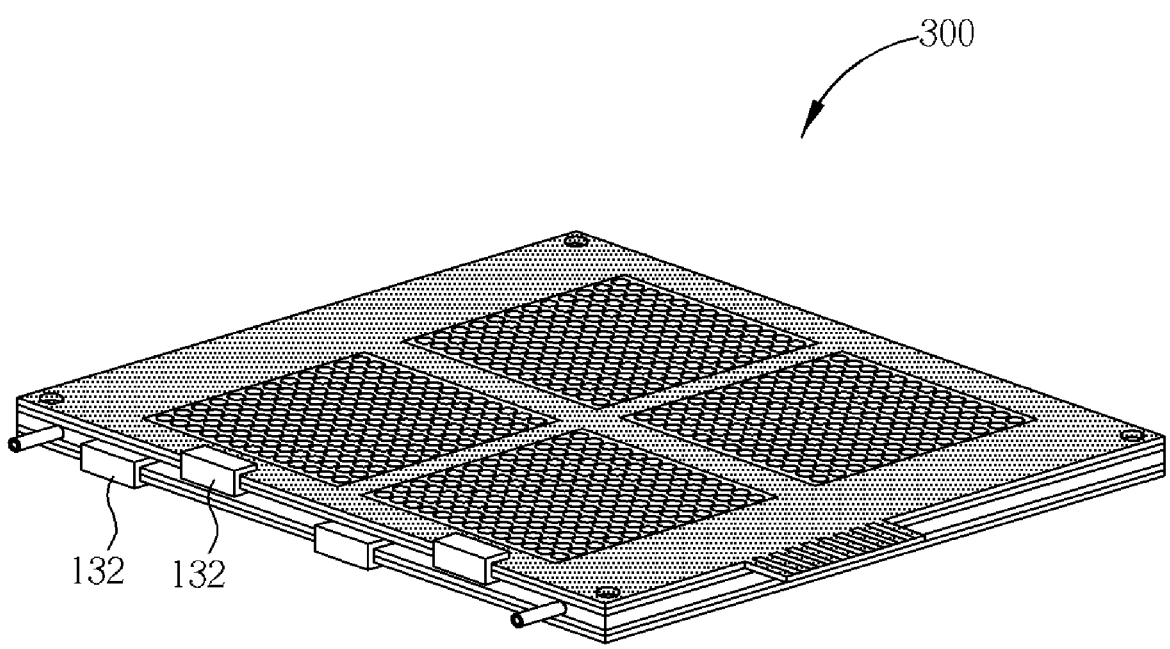
FIG. 8 is a prospective view of the fuel cell module assembly (after bending the conductive lug portions) according to this invention.

Interconnection between cell units is shown in FIG. 8. The conductive lug portion 132 is bended and configured to form a series connection between the eight cell units. As shown in FIG. 8, the conductive lug portion 132 is bended to connect with the circuit on the cathode conductive plate 302. Spot welding or soldering methods may be used to improve the electrical connection.

According to the present invention, the fuel cell module at least has the following different structures and advantages.

Single fuel cell module, which is depicted in FIG. 8. The function of the current collector is incorporated with the flow board. By doing this, the size, thickness and volume of the fuel cell module are reduced, thereby making such fuel cell module more suitable for daily applications and practices.

Figure 9:
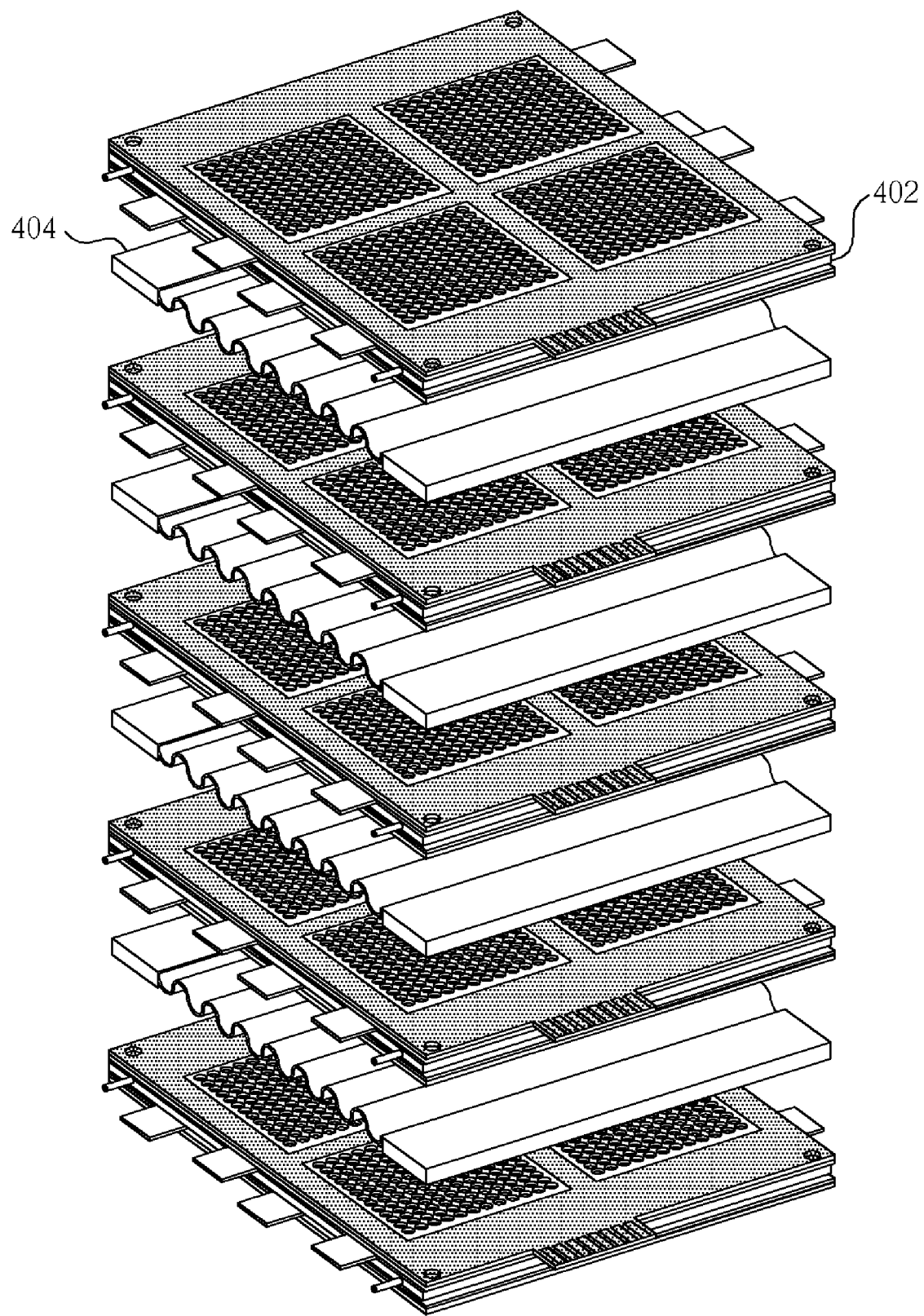
FIG. 9 is an exploded diagram of the structure of laminating multiple fuel cell modules according to this invention.

Lamination of multiple fuel cell modules is shown in FIG. 9. A cathode flow board or air flow board 404 is interposed between two fuel cell modules 402. The laminated multiple fuel cell module of FIG. 9 has a 20 W output. The projecting lug portions of the current collectors are handy and are easy to design according to series or parallel connection of the cell units for providing desired output voltages.

Figure 10:
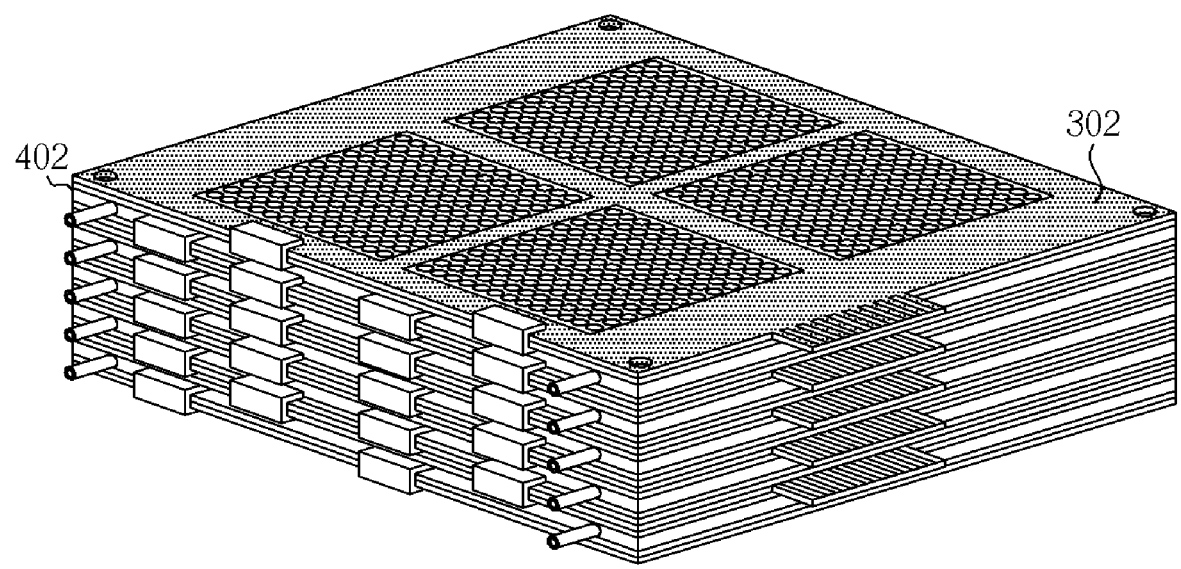
FIG. 10 is prospective view of the assembly structure of fuel cell module according to this invention.

(3) The laminated multiple fuel cell module is shown in FIG. 10. The structure of the laminated multiple fuel cell module is simplified and has combined anode current collector and flow board. The assembly process is also simplified. The cathode conductive plate 302 is laminated on the top and bottom of the laminated fuel cell module. This greatly reduces the thickness and volume of the fuel cell device and making it more practicable in the industry.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fuel cell module with wave-shaped flow board, comprising:
   a cathode conductive plate;
   an anode flow board comprising a first wave-shaped anode current collector fittingly embedded in a first anode reaction zone on a first side of a body substrate plate made of injection moldable polymer materials and a second wave-shaped anode current collector fittingly embedded in a second anode reaction zone on a second side of said body substrate plate opposite to said first side, wherein said first wave-shaped anode current collector defines a plurality of first independent anode fuel channels within said first anode reaction zone, and said second wave-shaped anode current collector defines a plurality of second independent anode fuel channels within said second anode reaction zone, wherein said second independent anode fuel channels do not contact with said first independent anode fuel channels, and wherein both of said first and second wave-shaped anode current collectors comprise a conductive lug portion that projects out to a sidewall of said fuel cell module and is bended in an angular manner along said sidewall such that said conductive lug portion is electrically connected with a circuit of said cathode conductive plate; and a membrane electrode assembly (MEA) interposed between said cathode conductive plate and said anode flow board.

2. The fuel cell module with wave-shaped flow board according to claim 1 wherein said injection moldable polymer materials comprise polyetheretherketone (PEEK), polyetherketoneketone (PEKK), Polysulfone (PSU), liquid crystal polymer (LCP) and their compounds.

3. The fuel cell module with wave-shaped flow board according to claim 1 wherein each of said first and second anode reaction zones is a recessed reaction zone and has a surface profile that conforms to said wave-shaped current collector.

4. The fuel cell module with wave-shaped flow board according to claim 1 wherein each of said first and second wave-shaped anode current collectors comprises a conductive substrate.

5. The fuel cell module with wave-shaped flow board according to claim 4 wherein said conductive substrate is made of stainless steel or metals capable of resisting chemical corrosion caused by gaseous or liquid fuel.

6. The fuel cell module with wave-shaped flow board according to claim 4 wherein each of said first and second wave-shaped anode current collectors further comprises a copper film plated on one side of said conductive substrate for reducing electrical resistance.

7. The fuel cell module with wave-shaped flow board according to claim 6 wherein each of said first and second wave-shaped anode current collectors further comprises an electro-coating paint covering said copper film in order to prevent the copper film from contacting with fuel.

8. The fuel cell module with wave-shaped flow board according to claim 1 wherein said first and second wave-shaped anode current collectors are adhered into said first and second anode reaction zones respectively by utilizing epoxy AB glue or epoxy polymer adhesive.

9. The fuel cell module with wave-shaped flow board according to claim 1 wherein said first and second wave-shaped anode current collectors are mounted on the first and second anode reaction zones by pressing-adhesive method, pressing-wedging method or pressing-snapping method.

10. The fuel cell module with wave-shaped flow board according to claim 1 further comprises a MEA frame interposed between said cathode conductive plate and said anode flow board, wherein said MEA frame has an opening for accommodating said MEA.

11. The fuel cell module with wave-shaped flow board according to claim 1 further comprises a thermal-pressing type adhesive film interposed between said cathode conductive plate and said anode flow board.

12. The fuel cell module with wave-shaped flow board according to claim 1 wherein said cathode conductive plate comprises PCB, graphite plate or metal plate.

13. A fuel cell module, comprising:
a cathode conductive board;
an anode flow board comprising a body substrate plate having thereon a first reaction zone and a second reaction zone structurally separated from said first reaction zone, said first and second reaction zones being both on the same side of said body substrate plate; a first wave-shaped current collector defining a plurality of first fuel channels within said first reaction zone; and a second wave-shaped current collector defining a plurality of second fuel channels within said second reaction zone, wherein said first wave-shaped current collector does not contact with said second wave-shaped current collector, and wherein said first and second fuel channels have the same flowing direction; and
a membrane electrode assembly (MEA) interposed between said cathode conductive plate and said anode flow board.

14. The fuel cell module according to claim 13 wherein said body substrate plate further comprises a crossing zone between said first and second reaction zones.

* * * * *